(12) United States Patent
Prechner et al.

(10) Patent No.: US 9,220,081 B2
(45) Date of Patent: Dec. 22, 2015

(54) ACCESS POINT LOCATION DISCOVERY IN UNMANAGED NETWORKS

(71) Applicants: Gaby Prechner, Rishon Lezion (IL); Yuval Amizur, Kfar-Saba (IL)

(72) Inventors: Gaby Prechner, Rishon Lezion (IL); Yuval Amizur, Kfar-Saba (IL)

(73) Assignee: Intel Corporation, Santa Clara, CA (US)

(*) Notice: Subject to any disclaimer, the term of this patent is extended or adjusted under 35 U.S.C. 154(b) by 72 days.

(21) Appl. No.: 14/197,570

(22) Filed: Mar. 5, 2014

(65) Prior Publication Data

US 2015/0257120 A1 Sep. 10, 2015

(51) Int. Cl.
- *H04M 11/04* (2006.01)
- *H04W 4/00* (2009.01)
- *H04W 24/00* (2009.01)
- *H04W 40/00* (2009.01)
- *H04W 64/00* (2009.01)
- *H04W 48/16* (2009.01)

(52) U.S. Cl.
CPC ............ *H04W 64/003* (2013.01); *H04W 48/16* (2013.01)

(58) Field of Classification Search
CPC .......... H04W 4/02; H04W 64/00; G01S 5/14; G01S 5/02
USPC ........ 455/404.2, 422.1, 423, 424, 446, 456.1, 455/456.2, 456.5
See application file for complete search history.

(56) References Cited

U.S. PATENT DOCUMENTS

| | | | |
|---|---|---|---|
| 2005/0124355 A1* | 6/2005 | Cromer et al. | 455/456.5 |
| 2006/0009235 A1 | 1/2006 | Sheynblat et al. | |
| 2008/0207209 A1* | 8/2008 | Katori et al. | 455/447 |
| 2008/0242310 A1* | 10/2008 | Vassilovski | 455/456.1 |
| 2009/0122773 A1 | 5/2009 | Gogic | |
| 2010/0329123 A1* | 12/2010 | Viswanathan et al. | 370/241 |
| 2011/0012780 A1* | 1/2011 | Alizadeh-Shabdiz | 342/357.23 |
| 2014/0045520 A1* | 2/2014 | Lim et al. | 455/456.1 |
| 2014/0099977 A1* | 4/2014 | Venkatraman | 455/456.5 |
| 2015/0099538 A1* | 4/2015 | Wang et al. | 455/456.1 |
| 2015/0139212 A1* | 5/2015 | Wang et al. | 370/338 |

FOREIGN PATENT DOCUMENTS

| | | |
|---|---|---|
| KR | 102011005907 A | 6/2011 |
| WO | WO-2010075369 A1 | 7/2010 |

OTHER PUBLICATIONS

"International Application Serial No. PCT/US2015/017727, International Search Report mailed Jun. 24, 2015", 4 pgs.
"International Application Serial No. PCT/US2015/017727, Written Opinion mailed Jun. 24, 2015", 6 pgs.

* cited by examiner

*Primary Examiner* — Dung Hong
(74) *Attorney, Agent, or Firm* — Schwegman Lundberg & Woessner, P.A.

(57) ABSTRACT

Embodiments of a system and method for Access Point Location Discovery in Unmanaged Networks are generally described herein. When a device attempts to discern its location indoors, it must be aware of the exact location of the network infrastructure that participates in the measurement. Indoors, it is the location of the Access Points (APs), which must be known to the device in order to triangulate its position. A system and method are disclosed for correctly discovering the exact location of network APs. An AP populates a neighbor list with location information by performing Wi-Fi scanning to receive a Media Access Control address and radio channel of a neighboring AP. The interested AP then acquires the position of this AP neighbor by querying its location and receiving its position information. Lastly, the received neighbor location is validated for correctness and reliability using Time of Flight measurements.

14 Claims, 2 Drawing Sheets

ACCESS POINT LOCATION DISCOVERY IN UNMANAGED NETWORKS

TECHNICAL FIELD

Embodiments pertain to wireless networks. Some embodiments relate to wireless networks that operate in accordance with one of the IEEE 802.11 standards including the IEEE 802.11-2012 standards. Some embodiments relate to time-of-flight (ToF) positioning. Some embodiments relate to location determination. Some embodiments relate to indoor navigation.

BACKGROUND

Outdoor navigation and positioning has been widely deployed following the development of various global navigation-satellite-systems (GNSS) as well as various cellular systems. Indoor navigation and positioning differs from outdoor navigation and positioning because the indoor environment does not enable the reception of location signals from satellites or cellular base stations as accurately as in the outdoor environment. As a result, accurate and real-time indoor navigation and positioning are difficult to achieve.

Conventional indoor navigation and positioning methods, i.e. "fingerprinting", "site-mapping" etc., calculate location by measuring received signal strength from an Access Point (AP). A handheld device initiates a location calculation by measuring the strength of a received signal and determines its position by figuring its distance from the location of a router or other access point transmitting the received signal. Unfortunately, these methods are inaccurate due to large variances in received signal strength. Fluctuations in received signal strength produce an approximately 20 meter radius of error. Another drawback of conventional indoor location methods is the inability of the network to initiate and significantly control the timing and management for location of a handheld device. When a device tries to query the location of APs in its vicinity, one query would preferably produce not only the location of a single AP, but also the location of that AP's neighbor APs as well. Receiving a complete tile, rather than the location of a single AP, reduces device power consumption and unnecessary air interface. In a managed network this is a solved problem because there is a centric data base containing the positions of the entire infrastructure in the venue. An unmanaged network presents challenges because an AP is not aware of the location of its neighbor APs in an unmanaged network.

In order for an unmanaged network to control the timing and management for location of handheld devices, the network must have the ability to discover the location of other access points belonging to the network that are in communication with the devices. Thus, there is a need for accurate indoor navigation and positioning methods that can be initiated and controlled by a network having known access points.

DETAILED DESCRIPTION

Figure 1:
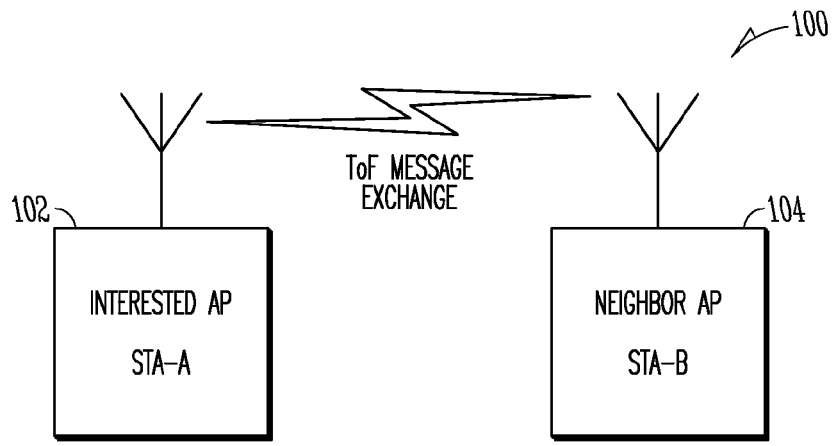
FIG. 1 is a network diagram illustrating an exemplary network environment suitable for Access Point Location Discovery In Unmanaged Networks, according to some example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a user equipment (UE), a wireless communication device or some other similar terminology known in the art.

A precise scalable Time-of-Flight (ToF) solution for indoor positioning and navigation is provided for environments where global-navigation-satellite-systems (GNSS, GPS, GLONASS and GALILEO) signals are not available. Time-of-Flight (ToF) is defined as the overall time a signal requires to propagate from the user to an Access Point (AP) and back to the user. A measured ToF value is converted into distance by dividing the measured time by two and multiplying it by the speed of light.

In many instances and applications, a network requires the client location, preferably without client initiation, interruption, intervention, inconvenience, or responses. An accurate method for indoor location where the location of APs in an unmanaged network are known is disclosed. The present network initiated location methods do not require the client to perform any client initiated ToF procedures and/or reporting back to the AP. The AP, rather than the client, fully controls the timing and management of the overall indoor location procedure, making the procedure more convenient and power efficient for the client.

When a device attempts to discern its location, it must be aware of the exact location of the network infrastructure that participates in the measurement. In an outdoor environment using GNSS, it is the location of the satellites that are exactly known. In an indoor environment using Wi-Fi indoor positioning, it is the location of the APs, which must be known to the device in order to triangulate its position. A system and method are provided for correctly discovering the exact location of infrastructure elements necessary for positioning of devices indoors.

FIG. 1 illustrates various network elements of a wireless network in accordance with some embodiments. Wireless network 100 includes a plurality of communication stations (STAs) and one or more access points (APs) which may communicate in accordance with IEEE 802.11 communication techniques. The communication stations may be mobile devices that are non-stationary and do not have fixed locations. The one or more access points may be stationary and have fixed locations. The stations may include an interested AP STA-A 102 and one or more responding stations STA-B 104. The interested AP 102 may be a communication station that initiates ToF positioning with the neighboring AP STA-B 104 to determine its location. The ToF positioning procedure may include the exchange of messages including the exchange of messages, as described in more detail below in FIGS. 2-4.

In some embodiments, the interested AP STA-A 102 may be a positioning station and may determine its location relative to one or more responding stations (e.g., cooperating stations and/or one or more access points). The cooperating stations may be either IEEE 802.11 configured communication stations (STAs) or APs. In other embodiments, the interested AP STA-A 102 may determine its location in geo-coordinates. In some embodiments, the neighboring AP may be able to determine its location either in relative or in geo-coordinates.

Figure 2:
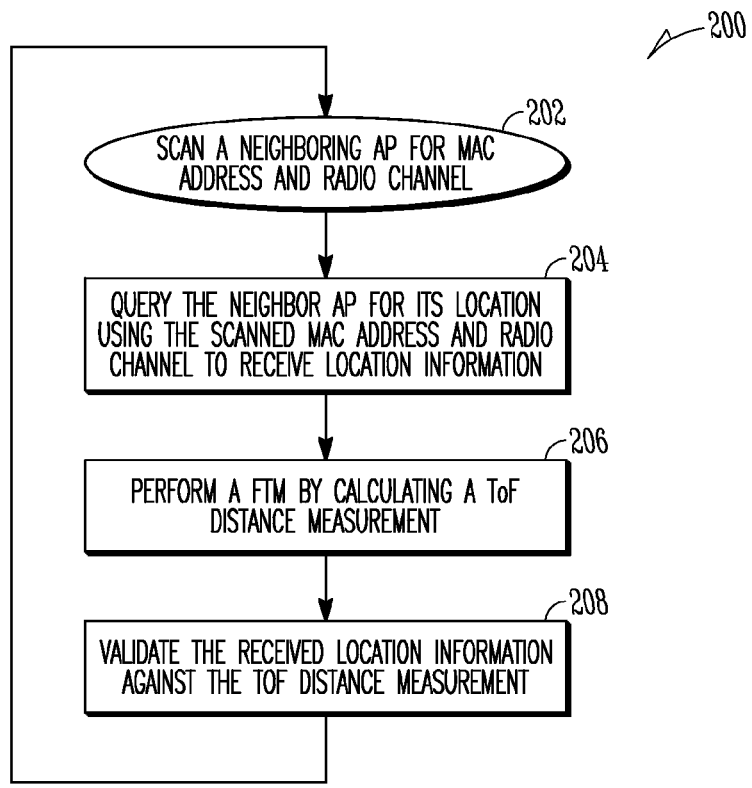
FIG. 2 shows a block diagram of a high level overview flow chart of Access Point Location Discovery In Unmanaged Networks, according to some example embodiments.

FIG. 2 is a flowchart illustrating operations in performing a method 200 of Access Point Location Discovery in Unmanaged Networks, according to some example embodiments. Operations in the method 200 may be performed by the interested AP STA-A 102 and/or neighboring AP STA_B 104 described above with respect to FIG. 1.

A device determines its position by first gaining knowledge of the exact location of the network infrastructure elements that participate in its triangulation measurements. Outdoor positioning devices first gain knowledge of the exact location of satellites and use the triangulation points to determine their locations. Rather than receiving satellite signals, indoor applications must use received Wi-Fi signals to learn the locations of network APs in their environments, which are then used as triangulation points. When a device tries to query the location of APs in its vicinity, one query would preferably produce not only the location of a single AP, but also the location of that AP's neighbor APs as well. Receiving a complete tile, rather than the location of a single AP, reduces device power consumption and unnecessary air interface. In a managed network this is a solved problem because there is a centric data base containing the positions of the entire infrastructure in the venue. An unmanaged network presents challenges because an AP is not aware of the location of its neighbor APs in an unmanaged network.

A novel protocol for communicating location information between APs in an unmanaged network and a reliable method for discovering and independently validating the location information such that errors are not propagated through the network are disclosed. The 3-part method comprises neighbor discovery, negotiating with the neighbor to receive its location, and validating the received location information.

In order for an AP to populate a neighbor list with location information, it must first become aware of its neighbor APs by performing a regular Wi-Fi scan for receiving a Media Access Control (MAC) address and radio channel of a neighboring AP. After becoming aware of a neighbor's MAC address and radio channel, the interested AP must then acquire the position of this AP neighbor by querying its location and receiving its position information. Lastly, the neighbor location is validated for correctness and reliability.

After discovery and communication, a validation process is performed according to one or more of the following operations. A Fine Timing Measurement (FTM), or ToF distance measurement, is first performed as described in 802.11 and detailed below in FIG. 3. Performing the fine timing measurement provides a distance measurement (i.e. a single triangulation point). The distance measurement, or range, creates a circle of certainty, having a radius equal to the measured distance and within which, the neighbor AP is certainly located. The circle of certainty is then used to initially validate the neighbor's communicated position. In other words, the actual ToF distance calculated from the fine timing measurement is compared to the position reported by the AP.

As each AP can also provide his neighbor AP's position, the interested AP can compare positions that were received from different APs and search for consistency, eliminating inconsistent locations such that any erroneous location is not propagated to other network entities. Each AP may also report its range from other APs and in some cases the position of the APs can be calculated independently, in a manner similar to finding a position from crowdsourcing, and can be used to compare with the reported location of a queried AP.

Each neighbor and the neighbor's neighbors are likewise queried in turn until the entirety of neighboring APs are located and validated. Upon completion of the query and validation process, the interested AP will have a list of its neighboring APs and their positions. Each AP in the now populated list may be assigned a confidence/reliability "grade" according to one or more parameters that may include whether the reported position of the neighbor was confirmed by the measured the range, or distance, from the interested AP, and the number of times the same AP was reported with the same location by different APs in the network. This validation process protects the user from receiving AP positions that were wrongly entered or delivered for any reason, including data corruption and transmission errors. A position wrongly entered in the list due to transmission errors or data corruption may be invalidated.

As shown in FIG. 2, the method 200 includes operations 202, 204, 206, and 208. Beginning in operation 202, the interested AP scans a neighbor AP for its MAC address and radio channel. Control flow proceeds to operation 204.

In operation 204, the interested AP queries the neighbor AP for its location according to the scanned MAC address and radio channel and receives its location information. Control flow proceeds to operation 206.

In operation 206, a FTM is performed by calculating a ToF distance measurement between the interested AP and the neighbor AP. The ToF measurement is performed using timers t1-t4 wherein, $ToF=((t4-t1)-(t3-t2))/2$. Messaging protocols for ToF measurements are detailed in FIG. 3 below. The distance is calculated by dividing the measured ToF by two and multiplying it by the speed of light. Control flow proceeds to operation 208.

In operation 208, the received location is validated at least against the TOF distance measurement. Other validation including grading the reliability of the reported location information may be performed. Other validation may comprise each AP in the now populated list having an assigned confidence/reliability "grade" according to one or more parameters that may include whether the reported position of the neighbor was confirmed by the measured the range, or distance, from the interested AP, and the number of times the same AP was reported with the same location by different APs in the network. This validation process protects the user from receiving AP positions that were wrongly entered or delivered for any reason, including data corruption and transmission errors. A position wrongly entered in the list due to transmission errors or data corruption may be invalidated.

Operations 202-208 are repeated until a current neighbor list is fully populated. Operations 202-208 are repeated querying each neighbor and the neighbor's neighbors in turn until the entirety of neighboring APs are located and validated. Upon completion of the query and validation process, the interested AP will have a list of its neighboring APs and their positions.

Figure 3:
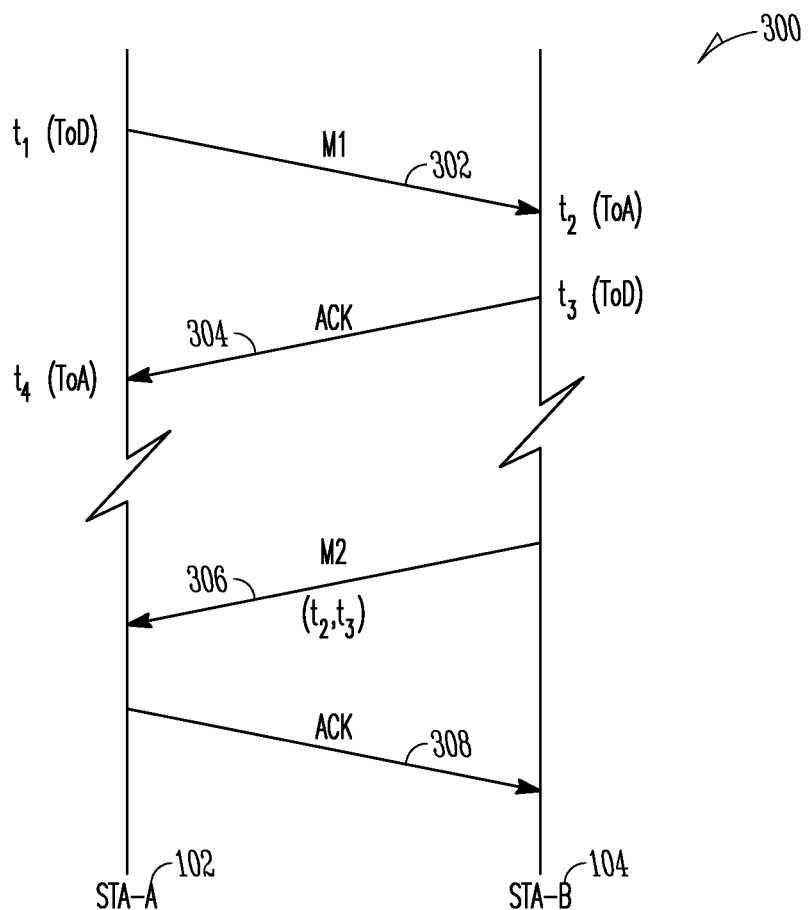
FIG. 3 illustrates a procedure for basic time-of-flight (ToF) calculation, in accordance with some exemplary embodiments.

FIG. 3 illustrates a procedure for basic time-of-flight (ToF) distance calculation of Access Point Location Discovery in Unmanaged Networks, in accordance with some exemplary embodiments. As illustrated in FIG. 3, interested AP station STA-A 102 may be arranged to transmit a message M1 302 carrying a management frame to neighbor AP station STA-B 104, which may respond with an ACK 304. M1 302 may be a timing measurement action frame. The timing measurement action frame may be a unicast management frame. T1, the M1 time of departure (ToD) from the interested AP STA-A 102 and t2, the time of arrival (ToA) of M1 at the neighboring AP STA-B 104, are saved.

The neighboring AP STA-B 104 may be arranged to transmit a message M2 306 at ToD, t3, carrying a management frame to interested AP STA-A 102, which may respond with an ACK 308. M2 306 may be a timing measurement action frame. The timing measurement action frame may be a unicast management frame. M2 306 may return saved time value t2 and a ToD of ACK 304, t3, time value to interested AP STA-A 102.

All time of departures and time of arrivals, t1-t4, are saved at STA-A 102. Interested AP STA-A 102 computes the ToF by the following equation:

$$\text{ToF} = ((t4-t1)-(t3-t2))/2 \qquad \text{(Equation 1)}$$

In some embodiments, the messages M1 302 and M2 306 may be a timing measurement action frame in accordance with 802.11. The message M1 302 may refer to an M1 frame and the message M2 306 may refer to an M2 frame. In some embodiments, the message M1 302 may be used to initiate ToF positioning with another AP.

In some embodiments, the message M1 may be a first timing measurement action frame and the message M2 may be a second timing measurement action frame. In some embodiments, the timing measurement action frames may be timing measurement frames. In some embodiments, a Media Access Control (MAC) Sublayer Management Entity (MLME) constructs the timing measurement frames.

In some embodiments, the timing measurement information may be a t2 value and a t3 value (i.e., two values) or a t3-t2 value (i.e., a single difference value). In these embodiments, the interested AP may be arranged to parse the structure of the message M2 306. By parsing the structure of message M2 306, the interested AP STA-A 102 can determine whether the message M2 306 contains either a t2 and a t3 value (i.e., two values), or a t3-t2 value (i.e., a single difference value). In some of these embodiments, the message M2 306 may include different elements or employ sub-element coding to allow the initiation station to parse the structure of message M2 306.

In some embodiments, t2 may be a time-stamp against a local clock associated with the arrival of message M1 302 at the neighboring AP STA-B 104, and t3 may be a time-stamp against the local clock associated with transmission of message M2 306 by the neighboring AP STA-B 104 (i.e., measured against the same clock as t2). In some embodiments, t1 may be a time-stamp against a local clock associated with the transmission of message M1 302 by the interested AP STA-A 102 and t4 may be a time-stamp against the local clock associated with receipt of the acknowledgement frame 304 that acknowledges receipt of the message M1 (i.e., measured against the same clock as t1).

In some embodiments, the t2 value is the ToA of message M1 302 at the neighboring AP STA-B 104, and the t3 value is time that the ACK frame 304 is sent by the neighboring AP STA-B 104. The inclusion of both t2 and t3 values may be more optimal as it may allow a particular and more straightforward way to calibrate for difference in the clock rates at the two stations for increased ToF accuracy. Furthermore, inclusion of a single value (t3-t2) may allow the relative timing drift between the recipient and the responding stations to be tracked for increased ToF accuracy.

Figure 4:
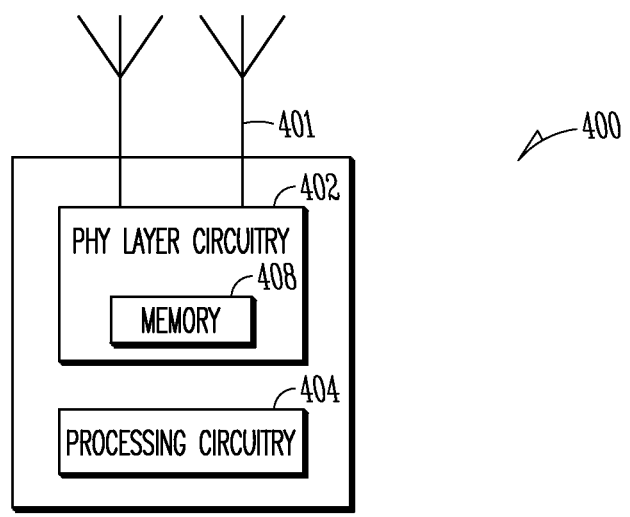
FIG. 4 is a functional diagram of an exemplary communication station in accordance with some embodiments.

FIG. 4 is a functional diagram of a communication station in accordance with some embodiments. In one embodiment, FIG. 4 illustrates a functional block diagram of an STA or UE 102 and 104 (FIG. 1) in accordance with some embodiments. STA 400 may be suitable for use as UE 102 (FIG. 1). Communication station 400 may be suitable for use as either a neighbor, such as neighboring AP STA-B 104 (FIG. 1), or an interested AP, such as interested AP STA-A 102 (FIG. 1). The STA 400 may include physical layer circuitry 402 for transmitting and receiving signals to and from eNBs 104 (FIG. 1) using one or more antennas 401. STA 400 may also include medium access control layer (MAC) circuitry 404 for controlling access to the wireless medium. UE 400 may also include processing circuitry 406 and memory 408 arranged to perform the operations described herein. In some embodiments, the physical layer circuitry 402 and the processing circuitry 404 may be configured to transmit and receive messages M1-M4 (FIG. 3) carrying time management frames as detailed above.

In accordance with some embodiments, the MAC circuitry 404 may be arranged to contend for a wireless medium configure frames or packets for communicating over the wireless medium and the PHY circuitry 402 may be arranged to transmit and receive signals. The PHY 402 may include circuitry for modulation/demodulation, upconversion/downconversion, filtering, amplification, etc. In some embodiments, the processing circuitry 404 of the STA device 400 may include one or more processors. In some embodiments, two or more antennas may be coupled to the physical layer circuitry arranged for sending and receiving signals. The memory 408 may be store information for configuring the processing circuitry 406 to perform operations for configuring and transmitting message frames and performing the various operations described herein.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the communication station STA 400 may include one or more antennas. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station.

In some embodiments, the communication station STA 400 may include one or more of a keyboard, a display, a non-volatile memory port, multiple antennas, a graphics processor, an application processor, speakers, and other mobile device elements. The display may be an LCD screen including a touch screen.

Although communication station STA 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station STA 400 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism 408 for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station STA 400 may include one or more processors and may be configured with instructions stored on a computer-readable storage device memory 408.

In one example, a method for Access Point location discovery in an unmanaged network comprises scanning, by an interested Access Point (AP), a neighboring AP for a Media Access Control (MAC) address and radio channel belonging to the neighboring AP, querying, by the interested AP from the neighbor AP, a location of the neighboring AP using the scanned MAC address and radio channel, receiving, at the interested AP from the neighboring AP, the location of the neighboring AP, performing, by the interested AP, a Fine Timing Measurement (FTM) by calculating a Time-of-Flight (TOF) distance measurement, and validating, at the interested AP, the received location of the neighboring IP against the ToF distance measurement.

In another example, a communication station STA 400 is arranged to discover Access Point locations in an unmanaged network, the communication station comprising physical layer circuitry and processing elements to scan a neighboring AP for a Media Access Control (MAC) address and radio channel belonging to the neighboring AP, query a location of the neighboring AP using the scanned MAC address and radio channel, receive the location of the neighboring AP, perform a Fine Timing Measurement (FTM) by calculating a Time-of-Flight (TOF) distance measurement, and validate the received location of the neighboring IP against the ToF distance measurement.

In another example, a non-transitory computer-readable storage medium stores instructions for execution by one or more processors to perform operations for Access Point location discovery in an unmanaged network, the method comprising scanning, by an interested Access Point (AP), a neighboring AP for a Media Access Control (MAC) address and radio channel belonging to the neighboring AP, querying, by the interested AP from the neighbor AP, a location of the neighboring AP using the scanned MAC address and radio channel, receiving, at the interested AP from the neighboring AP, the location of the neighboring AP, performing, by the interested AP, a Fine Timing Measurement (FTM) by calculating a Time-of-Flight (TOF) distance measurement, and validating, at the interested AP, the received location of the neighboring IP against the ToF distance measurement.

In another example, a method for Access Point location discovery in an unmanaged network comprises determining, by an interested Access Point (AP), a list of locations for neighboring APs in a network and validating, at the interested AP, the list of locations for neighboring APs against a ToF distance measurement.

In another example, a method for Access Point location discovery in an unmanaged network further comprises reporting, by the neighboring AP, its distance from its neighboring APs.

In another example, a method for Access Point location discovery in an unmanaged network further comprises querying, by the interested AP, every neighbor and the neighbor's neighbors until the entirety of the interested AP's neighboring APs are located and validated.

In another example, a method for Access Point location discovery in an unmanaged network further comprises assigning a reliability grade to a location according to whether the reported position of the neighboring AP was confirmed by the measured distance from the interested AP.

In another example, a method for Access Point location discovery in an unmanaged network further comprises assigning a reliability grade to a location according to the number of times the same AP was reported with the same location by different APs in a network.

In another example, a method for Access Point location discovery in an unmanaged network further comprises invalidating a position wrongly entered in a list due to transmission errors.

In another example, a method for Access Point location discovery in an unmanaged network further comprises invalidating a position wrongly entered in the list due to data corruption.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. A method for Access Point location discovery in an unmanaged network, the method comprising:
  scanning, by an interested Access Point (AP), a neighboring AP for a Media Access Control (MAC) address and radio channel belonging to the neighboring AP;
  querying, by the interested AP from the neighbor AP, a location of the neighboring AP using the scanned MAC address and radio channel;
  receiving, at the interested AP from the neighboring AP, the location of the neighboring AP;

performing, by the interested AP, a Fine Timing Measurement (FTM) by calculating a Time-of-Flight (TOF) distance measurement;

validating, at the interested AP, the received location of the neighboring IP against the ToF distance measurement; and assigning a reliability grade to a location according to the number of times the same AP was reported with the same location by different APs in a network.

2. The method of claim 1 further comprising reporting, by the neighboring AP, its distance from its neighboring APs.

3. The method of claim 1 further comprising querying, by the interested AP, every neighbor and the neighbor's neighbors until the entirety of the interested AP's neighboring APs are located and validated.

4. The method of claim 1 further comprising assigning a reliability grade to a location according to whether the reported position of the neighboring AP was confirmed by the measured distance from the interested AP.

5. A communication station arranged to discover Access Point locations in an unmanaged network, the communication station comprising physical layer circuitry and processing elements to:

scan a neighboring AP for a Media Access Control (MAC) address and radio channel belonging to the neighboring AP;

query a location of the neighboring AP using the scanned MAC address and radio channel;

receive the location of the neighboring AP;

perform a Fine Timing Measurement (FTM) by calculating a Time-of-Flight (TOF) distance measurement;

validate the received location of the neighboring IP against the ToF distance measurement; and assign a reliability grade to a location according to whether the reported position of the neighboring AP was confirmed by the measured distance from the interested AP.

6. The communication station of claim 5 further arranged to report its distance from its neighboring APs.

7. The communication station of claim 5 further arranged to query every neighbor and the neighbor's neighbors until the entirety of the interested AP's neighboring APs are located and validated.

8. The communication station of claim 5 further arranged to assign a reliability grade to a location according to the number of times the same AP was reported with the same location by different APs in a network.

9. The communication station of claim 5 further arranged to comprise physical layer circuitry and associated antenna(s) capable of scanning a neighboring (Access Point) AP for a Media Access Control (MAC) address and radio channel belonging to the neighboring AP, querying a location of the neighboring AP using the scanned MAC address and radio channel, receiving, the location of the neighboring AP, and performing a Fine Timing Measurement (FTM) by calculating a Time-of-Flight (TOF) distance measurement.

10. The communication station of claim 5 further arranged to comprise processing circuitry for:

scanning a neighboring AP for a Media Access Control (MAC) address and radio channel belonging to the neighboring AP;

querying a location of the neighboring AP using the scanned MAC address and radio channel;

receiving the location of the neighboring AP;

performing a Fine Timing Measurement (FTM) by calculating a Time-of-Flight (TOF) distance measurement; and validating the received location of the neighboring IP against the ToF distance measurement.

11. A non-transitory computer-readable storage medium that stores instructions for execution by one or more processors to perform operations for Access Point location discovery in an unmanaged network, the method comprising:

scanning, by an interested Access Point (AP), a neighboring AP for a Media Access Control (MAC) address and radio channel belonging to the neighboring AP;

querying, by the interested AP from the neighbor AP, a location of the neighboring AP using the scanned MAC address and radio channel;

receiving, at the interested AP from the neighboring AP, the location of the neighboring AP;

performing, by the interested AP, a Fine Timing Measurement (FTM) by calculating a Time-of-Flight (TOF) distance measurement;

validating, at the interested AP, the received location of the neighboring IP against the ToF distance measurement; and assigning a reliability grade according to whether the reported position of the neighboring AP was confirmed by the measured distance from the interested AP.

12. The non-transitory computer-readable storage medium of claim 11 further comprising reporting, by the neighboring AP, its distance from its neighboring APs.

13. The non-transitory computer-readable storage medium of claim 11 further comprising querying, by the interested AP, every neighbor and the neighbor's neighbors until the entirety of the interested AP's neighboring APs are located and validated.

14. The non-transitory computer-readable storage medium of claim 11 further comprising assigning a reliability grade according to the number of times the same AP was reported with the same location by different APs in a network.

* * * * *